United States Patent
Monticello

(10) Patent No.: US 9,784,354 B2
(45) Date of Patent: Oct. 10, 2017

(54) METHOD FOR CONTROLLING A LIMITED SLIP DIFFERENTIAL

(71) Applicant: Ford Global Technologies, LLC, Dearborn, MI (US)

(72) Inventor: Andrew Monticello, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 194 days.

(21) Appl. No.: 14/864,211

(22) Filed: Sep. 24, 2015

(65) Prior Publication Data
US 2017/0089439 A1 Mar. 30, 2017

(51) Int. Cl.
B60K 23/04 (2006.01)
F16H 48/22 (2006.01)
F16H 48/20 (2012.01)

(52) U.S. Cl.
CPC ....... F16H 48/22 (2013.01); *F16H 2048/204* (2013.01)

(58) Field of Classification Search
CPC ................................................ B60K 2023/043
See application file for complete search history.

(56) References Cited

U.S. PATENT DOCUMENTS

| 4,776,234 | A | 10/1988 | Shea |
| 4,966,250 | A * | 10/1990 | Imaseki ............ B60K 23/0808 180/197 |
| 6,105,703 | A * | 8/2000 | Kuroda .................. B60K 17/35 180/248 |
| 6,817,961 | B2 | 11/2004 | Moore et al. |
| 7,549,941 | B2 | 6/2009 | Boddy |
| 7,801,657 | B2 | 9/2010 | Piyabongkarn et al. |
| 2010/0009798 | A1 | 1/2010 | Keller |
| 2010/0049408 | A1 * | 2/2010 | Abadie ................. B60T 8/1706 701/48 |
| 2010/0210390 | A1 | 8/2010 | Ekonen et al. |
| 2013/0231837 | A1 * | 9/2013 | Holbrook ............... B60K 23/04 701/69 |
| 2016/0229290 | A1 * | 8/2016 | Chimner ............ B60K 23/0808 |

FOREIGN PATENT DOCUMENTS

| EP | 0415554 A1 * | 3/1991 | ............ B60K 23/08 |
| EP | 0575152 A1 * | 12/1993 | ............ B60K 23/04 |
| WO | 2015054368 A1 | 4/2015 | |

* cited by examiner

*Primary Examiner* — Tisha Lewis
(74) *Attorney, Agent, or Firm* — James Dottavio; Brooks Kushman P.C.

(57) ABSTRACT

A vehicle includes a differential, a clutch configured to lock the differential, and a controller. The controller is programmed to, in response to a condition or specified drive mode associated with locking the differential, adjust a clutch torque to lock the differential. The controller is further programmed to, in response to an output speed of the differential exceeding a threshold during the condition, decrease the clutch torque to allow the clutch to slip.

16 Claims, 2 Drawing Sheets

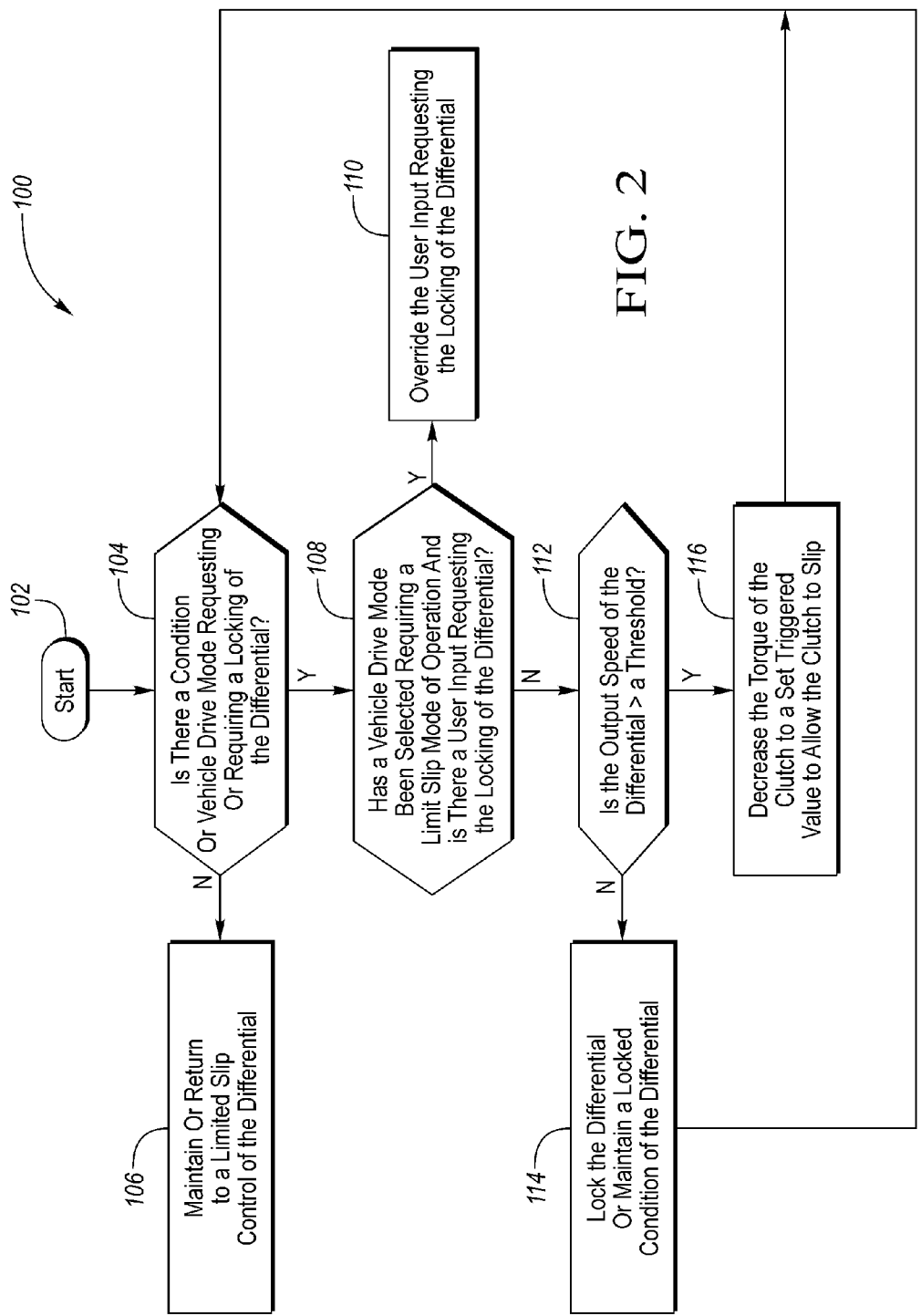

METHOD FOR CONTROLLING A LIMITED SLIP DIFFERENTIAL

TECHNICAL FIELD

The present disclosure relates to limited slip type and locking type differentials that may be used in automotive systems.

BACKGROUND

Limited slip differentials that are used in automobiles include mechanisms that are configured to limit a speed difference between the two outputs of the differential.

SUMMARY

A vehicle includes a differential, a clutch configured to lock the differential, and a controller. The controller is programmed to, in response to a condition associated with locking the differential, adjust a clutch torque to lock the differential. The controller is further programmed to, in response to an output speed of the differential exceeding a threshold during the condition, decrease the clutch torque to allow the clutch to slip.

A differential includes a first output shaft, a second output shaft, a clutch configured to adjust relative speeds of the output shafts, and a controller. The controller is programmed to, in response to a condition associated with synchronized speeds of the output shafts, adjust a clutch torque to lock the clutch. The controller is further programmed to, in response to the speeds of output shafts exceeding a threshold during the condition, decrease the clutch torque to slip the clutch.

A differential controller includes input channels configured to receive signals indicative of differential output speeds and a condition associated with locking a differential; an output channel configured to provide a command to activate a clutch that is configured to adjust relative speeds of differential outputs; and control logic configured to generate the command to activate the clutch in order to lock the differential in response to receiving the signal indicative of the condition and to generate the command to activate the clutch in order to slip the differential in response to a differential output speed exceeding a threshold during the condition.

BRIEF DESCRIPTION OF THE DRAWINGS

FIG. 2 is a flowchart illustrating a method of controlling the differential.

DETAILED DESCRIPTION

Figure 1:
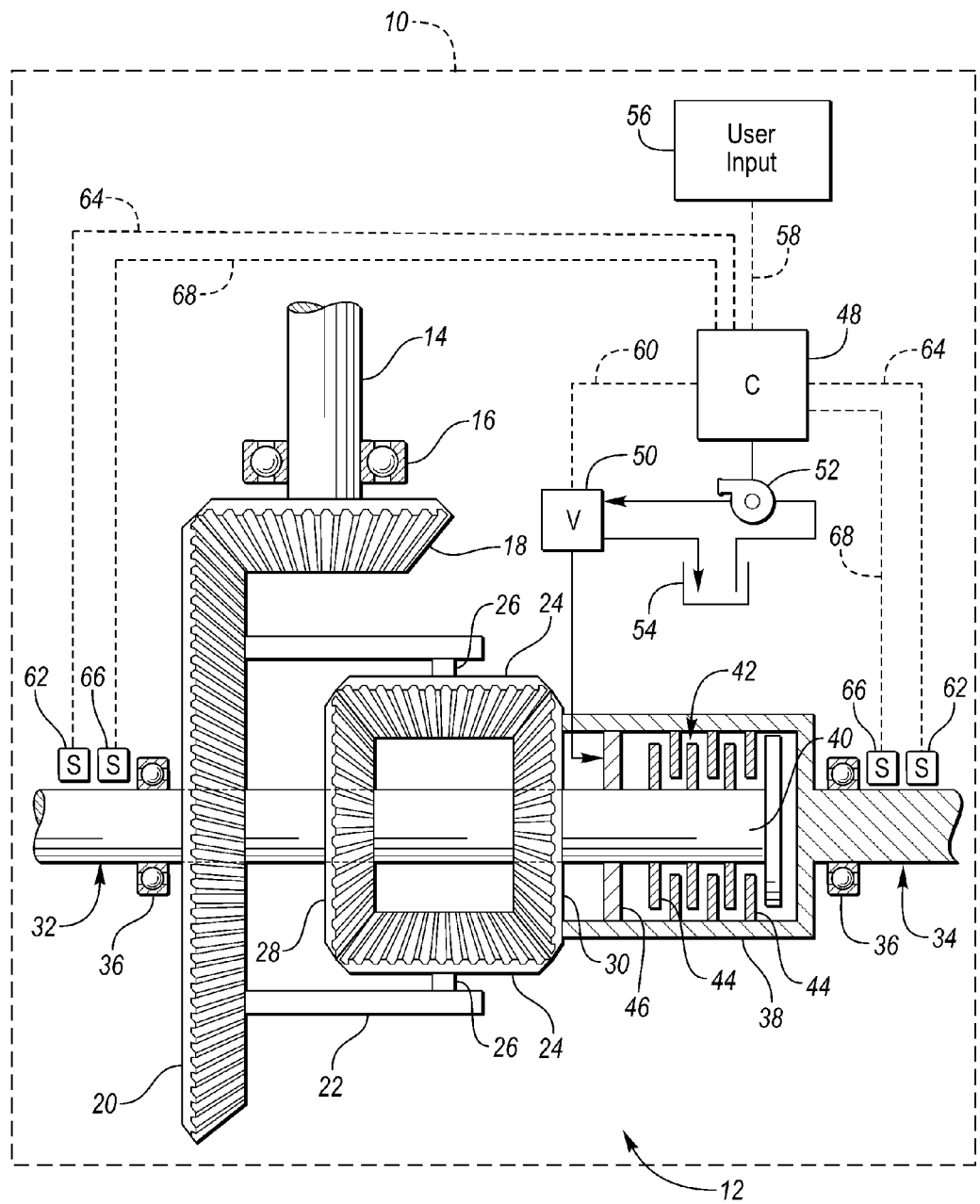
FIG. 1 is a schematic diagram illustrating a vehicle having a differential.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A limited slip differential in a vehicle may include a clutch to regulate the amount of slip between two differential outputs. The clutch may be configured to lock in response to a driver request or in response to a selected vehicle driving mode where locking the differential may be advantageous. In order to lock the differential the torque of the clutch is increased to eliminate the slip and synchronize the speeds of the differential outputs. Under certain circumstances, however, locking the differential could create an unsafe or unwanted situation. In order to prevent situations where it may be unsafe or unwanted to lock the differential, a maximum output speed of the differential may be set. When the output speed of the differential becomes greater than the maximum speed, the torque of the clutch is reduced to transition the differential from a locked mode of operation to an open or slip mode of operation.

Furthermore, a specific maximum output speed of the differential may be set for each specific vehicle driving mode that may be selected. Based on the driver inputs certain surfaces may be better suited for a locked differential. For example, it may be more desirable for a vehicle in the sand to have a locked differential at higher speeds than on it would be on dry pavement. While the vehicle is traveling over sand the emphasis may be on traction, which may be achieved by applying torque to the clutch to lock the differential. While the vehicle is traveling over pavement the emphasis may be on handling, which can be detrimental by applying too much torque to the clutch causing the differential to lock during conditions where it is undesirable to have a locking differential. The sand and pavement example demonstrates that locking the differential above certain speeds may have a negative effect under some conditions, while having a positive effect under other conditions.

Referring to FIG. 1, a vehicle 10 having a differential 12 is illustrated. For clarification purposes, some of the internal components of the differential 12 are shown as cross-sections. The differential 12 may be utilized in a vehicle such as an automobile, truck, farm equipment, or military transport vehicle. The differential may include a housing (not shown) that contains and supports the various elements of the differential 12. The differential 12 includes an input shaft 14. The input shaft 14 may be supported in the housing by at least one input bearing 16. The input shaft 14 may also be referred to as the driveshaft. The input shaft 14 may connect to a vehicle powertrain. The input shaft 14 may receive power from any conventional power source in a vehicle such as an internal combustion engine, electric machine (electric motor), fuel-cell, etc. The input shaft 14 may be connected to a manual or automatic transmission of the vehicle 10.

An input gear 18 may be connected to the input shaft 14. The input gear 18 may be a separate component that is secured to the input shaft 14 or may be an integral part of the input shaft 14. The input gear 18 may be configured to mesh with a ring gear 20. A carrier 22 may be affixed to the ring gear 20. At least one planet gear 24 may be rotatably secured to the carrier 22. The planet gears 24 may be rotatably secured to the carrier 22 by at least one pin 26. In the embodiment shown, two planet gears are depicted. However, it should be understood that the disclosure is meant to include carriers that have one or more planet gears rotatably affixed thereto. The planet gears 24 mesh with a first output gear 28 and a second output gear 30. The first output gear 28 may be connected to a first output shaft 32 (or half shaft). The first output gear 28 may be a separate component that is secured to the first output shaft 32 or may be an integral part of the first output shaft 32. The second output gear 30 may be connected to a second output shaft 34 (or half shaft). The second output gear 30 may be a separate component that is secured to the second output shaft 34 or may be an integral part of the second output shaft 34. The first output shaft 32 and second output shaft 34 may be rotatably connected to the drive wheels of the vehicle 10. The first output shaft 32 and second output shaft 34 may each be supported in the housing by at least one output bearing 36.

The second output shaft 34 may include a carrier portion 38 that is configured to receive a proximal end 40 of the first output shaft 32. The first output shaft 32 may pass through an orifice defined by the second output gear 30 such that the proximal end 40 of the first output shaft 32 may be received within the carrier portion 38 of the second output shaft 34. Alternatively, the first output shaft 32 may be supported by a bearing disposed within the orifice defined by the second output gear 30.

A clutch 42 may also be disposed within the carrier portion 38 of the second output shaft 34. The clutch 42 may include a plurality of friction discs 44. The friction discs 44 may be secured to either the first output shaft 32 or the carrier portion 38 of the second output shaft 34 in an alternating configuration. The carrier portion 38 of the second output shaft 34 may also include a piston 46 that is configured to engage and disengage the frictions discs 44 of the clutch 42. When the piston 46 is engaging the friction discs 44, adjacent friction discs 44 are pressed into engagement with each other so that torque may transfer between the adjacent friction discs 44, and ultimately so that torque may transfer between the first output shaft 32 and second output shaft 34. The piston 46 depicted in FIG. 1 is shown as hydraulically actuated. However, it should be understood that the piston 46 may be actuated in other manners. For example, the piston 46 may be actuated by an electrical solenoid, an electrical motor, magnets, etc. Also, additional mechanical mechanisms may be used to guide the piston. For example, a ball ramp may connect the piston 46 to a motor, or a bearing block that is moveable along a stationary rail may connect the piston 46 to an electrical solenoid.

The friction discs 44 of the clutch 42 may be disengaged to allow the differential to operate as an open differential. The friction discs 44 of the clutch 42 may be engaged to allow the differential to operate as a limited slip differential. The friction discs 44 of the clutch 42 may also be engaged to allow the differential to operate as a locked differential. As the pressure on the piston 46 increases (and the pressure between adjacent friction discs 44 increases) the amount of torque on the clutch 42 will increase. As the torque increases on the clutch 42 the differential 12 may transition from operating as limited slip differential to a locked differential. When the differential 12 is operating as a limited slip differential, a speed differential between the first output shaft 32 and second output shaft 34 will be limited. When the differential is locked, the speed of the first output shaft 32 will match the speed of the second output shaft 34.

The differential 12 may be an electronic limited slip differential that includes a controller 48 that is utilized to adjust the torque of the clutch 42. In the described embodiment, where the piston 46 is hydraulically operated, the controller 48 may generate commands to operate a valve 50 that is configured to adjust the hydraulic pressure on the piston 46 to either increase or decrease the torque on the clutch 42. The controller 48 may also be in communication with a hydraulic pump 52 that is configured to generate the necessary hydraulic pressure required to operate the piston 46 in order to obtain the desired torque on the clutch 42. The valve 50 will direct the pressurized hydraulic fluid from the pump 52 to the piston 46 to increase the torque on the clutch 42. When it is necessary to decrease the torque on the clutch 42, the valve 50 will isolate the piston 46 from the pressurized hydraulic fluid generated by the pump 52 and decrease the pressure on the piston 46 by directing the hydraulic fluid acting piston 46 to a sump 54. The sump 54 may be exposed to the atmosphere which will in turn decrease the pressure on the hydraulic fluid to the atmospheric pressure. The pump 52 may then draw the hydraulic fluid from the sump 54 to re-pressurize the hydraulic fluid.

The controller 48 may adjust the torque of the clutch 42 such that the differential 12 operates in a limited slip operational mode. The controller 48 may also adjust the torque of the clutch 42 to lock the differential and synchronize the speeds of the first output shaft 32 and second output shaft 34 in response to a condition associated with locking the differential 12. The controller 48 may include control logic and/or algorithms stored within the memory of the controller 48 to operate the differential 12 in an open mode, a limited slip mode, or a locked mode.

The condition associated with locking of differential 12 (and therefore synchronized speeds of the first output shaft 32 and second output shaft 34) may be based on a user input 56. The user input 56 triggering the condition to the lock the differential 12 may simply be the user selecting or requesting a differential locked mode (via a push button or some other input control device) or may be the user selecting or requesting a drive mode that is associated with or requires locking the differential 12. Drive modes where it may be desirable to lock the differential 12 to increase the traction between the wheels and the surface that the vehicle 10 is traveling over may include, but are not limited to, a sport operational mode, a muddy surface operational mode, a beach (sandy) surface operational mode, a rock crawl mode, a rocky terrain mode, a track/drift (cornering) mode, and a snowy surface operational mode. It should be understood, however, that depending on the specific vehicle design and performance abilities, it may be desirable to operate the differential 12 in a limited slip mode as opposed to a locked mode for any of the listed drive modes. The controller 48 may include an input channel 58 that transmits a signal to the controller 48 that is indicative of the condition associated with locking the differential 12 (e.g., the user input 56). The controller 48 may also include an output channel 60 that is configured to generate a signal to provide a command to activate or deactivate the clutch 42 such that the differential 12 operates in an open mode, limited slip mode, or locked mode. In the described embodiment in FIG. 1, the command to activate or deactivate the clutch 42 is sent to the valve 50 in order to increase or decrease the torque on the clutch 42. However, as indicated above the clutch 42 may include other mechanisms to increase or decrease the torque on the clutch 42. It should be understood, that the output channel 60 could be configured to generate the command to increase or decrease the torque on the clutch 42 based on an alternative clutch engagement mechanism.

If the differential 12 is operating in a locked mode based on the condition associated with locking differential 12 (and the synchronization of the speeds of the first output shaft 32 and second output shaft 34), the controller 48 may be configured generate signal to provide a command through the output channel 60 to decrease the torque of the clutch 42 in order to allow the clutch 42 to slip in response to an output speed (of either or both of the first output shaft 32 and second output shaft 34) exceeding a threshold speed. Speed sensors 62 may be placed on the first output shaft 32 and second output shaft 34. The speed sensors 62 may transmit the relative speeds of the first output shaft 32 and second output shaft 34 to the controller 48 through signals sent via input channels 64. Torque sensors 66 may also be placed on the first output shaft 32 and second output shaft 34. The torque sensors 66 may transmit the relative torques of the first output shaft 32 and second output shaft 34 to the controller 48 through signals sent via input channels 68.

The threshold output speed of the differential 12 that triggers the torque of the clutch 42 to decrease in order to allow the clutch 42 to slip may be specific for each drive mode that is associated with or requires locking the differential. For example, the clutch 42 may be configured to slip and unlock at a lower speed while in the snowy surface operational mode relative to the speed that the clutch 42 is configured to slip and unlock at while in the beach surface operational mode.

The controller 48 may include control logic and/or algorithms that are configured to generate the command to activate the clutch 42 to lock the differential 12 in response to receiving the signal via the input channel 58 indicative of the condition associated with locking differential 12. The controller 48 may also include control logic and/or algorithms that are configured to slip the differential 12 in response to receiving a signal via the input channels 64 indicative the differential output speed is exceeding the threshold speed during the condition associated with locking the differential 12.

While illustrated as one controller, the controller 48 may be part of a larger control system and may be controlled by various other controllers throughout the vehicle 10, such as a vehicle system controller (VSC). It should therefore be understood that the controller 48 and one or more other controllers can collectively be referred to as a "controller" that controls various actuators in response to signals from various sensors to control various functions of the vehicle 10. The controller 48 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 48 in controlling the engine or vehicle.

Referring to FIG. 2, a flowchart illustrating a method 100 of controlling the differential 12 is depicted. The controller 48 may be programmed to issue instructions to perform the method 100 which may be stored as control logic or an algorithm within the memory of the controller 48. The method 100 includes adjusting a torque on the clutch 42 to allow the clutch 42 to slip while in a locked mode of operation if the output speed of the differential exceeds a threshold value.

The method 100 begins at the start block 102. The method 100 may be initiated by an ignition of the vehicle 10 being placed into an "on" position. Once the method 100 has been initiated at start block 102, the method 100 moves on to step 104 where it is determined if there is a condition or selection of a vehicle drive mode that is either requiring, requesting, or associated with locking the differential 12. It should be understood that locking the differential corresponds to a synchronization of the speeds of the first output shaft 32 and second output shaft 34, and that any condition, request, or selection that may be associated with locking of the differential 12 also includes a condition, request, or selection that is associated with the synchronization of the speeds of the first output shaft 32 and second output shaft 34. The condition associated with locking differential 12 may correspond to a user input 56 requesting or selecting the locking of the differential 12 or the user requesting or selecting a vehicle drive mode that is associated with locking the differential 12, as described above.

If it is determined at step 104 that there is no condition or an expiration of a condition requesting or requiring the locking of the differential 12, the method 100 moves on to step 106 where the controller 48 either maintains or returns to a limited slip control mode of operation of the differential 12. The limited slip control mode of operation of the differential 12 may be stored as control logic or algorithms within the memory of the controller 48. If at step 106 the controller 48 is returning the differential 12 to a limited slip mode of operation from a locked mode of operation, the torque of the clutch 42 may be ramped in a gradual fashion to a desired value based on the limited slip mode of operation to prevent driver discomfort or any noise, vibration, or harshness (NVH) issues.

Returning to step 104, if it is determined that there is a condition requesting or requiring the locking of the differential 12, the method 100 moves on to step 108. At step 108 it is determined if a vehicle drive mode has been selected that requires a limited slip mode of operation of the differential 12 while a user input 56 has also requested the locking of the differential 12. Vehicle drive modes where it may not be desired to lock the differential 12 to increase the traction between the wheels and the surface that the vehicle 10 is traveling over may include, but are not limited to, a wet surface operational mode, a slippery surface operation mode, a muddy surface operational mode, a beach (sandy) surface operational mode, and a snowy surface operational mode. It should be understood, however, that depending on the specific vehicle design and performance abilities, it may be desirable to operate the differential 12 in a locked mode as opposed to a limited slip mode for any of the listed drive modes. If a vehicle drive mode has been selected that requires a limited slip mode of operation of the differential 12 while a user input 56 has also requested the locking of the differential 12, the method moves on to step 110. At step 110 the controller 48 overrides the user input 56 requesting the locking differential 12 and maintains the limited slip mode of operation of the differential 12.

Returning to step 108, if there is not a simultaneous vehicle drive mode selection that requires a limited slip mode of operation of the differential 12 and a user input 56 requesting that the differential 12 be locked, the method 100 moves on to step 112. At step 112 it is determined if the output speed (of either or both of the first output shaft 32 and second output shaft 34) of the differential 12 is greater than a threshold speed. If it is determined that the output speed of the differential 12 is not greater than a threshold speed, the method moves on to step 114 where the controller 48 either locks the differential 12 or maintains a locked condition of the differential 12. If at step 114 the controller 48 is transitioning the differential 12 to a locked mode of operation from either an open mode of operation or a limited slip mode of operation, the torque of the clutch 42 may be ramped in a gradual fashion to a desired value based on the locked mode of operation to prevent driver discomfort or any NVH issues. The method 100 then returns to step 104 where the process is repeated.

Returning to step 112, if it is determined that the output speed of the differential 12 is greater than the threshold speed, the method moves on to step 116 where the controller 48 decreases the torque of the clutch 42 to set triggered value to allow the clutch 42 to slip. The specific torque value that the clutch 42 is allowed to slip may be a specifically set value or may be dependent on the specific drive mode as described above. The method 100 then returns to step 104 where the process is repeated.

The method 100 depicted in FIG. 2 is for illustrative purposes only. The disclosure should be construed to include embodiments of the method 100 where some of the steps may be rearranged or omitted.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a differential;
   a clutch configured to lock the differential; and
   a controller programmed to,
      in response to a user input to lock the differential, adjust a clutch torque to lock the differential,
      in response to a differential output speed exceeding a threshold while the differential is locked, decrease the clutch torque to slip the clutch, and
      in response to a drive mode requiring limited slip of the differential, override the user input.

2. The vehicle of claim 1, wherein the controller is further programmed to, in response to an expiration of the user input to lock the differential, reduce the clutch torque and transition to a limited slip operational mode.

3. The vehicle of claim 1, wherein the drive mode is a slippery surface operational mode.

4. The vehicle of claim 1, wherein the user input to lock the differential is a user selection of a second drive mode associated with locking the differential.

5. The vehicle of claim 4, wherein the second drive mode is a beach surface operational mode.

6. A differential comprising:
   first and second output shafts;
   a clutch configured to adjust relative speeds of the output shafts; and
   a controller programmed to,
      in response to a user input to synchronize speeds of the output shafts, adjust a clutch torque to lock the clutch,
      in response to output shaft speeds exceeding a threshold while the differential is locked, decrease the clutch torque to slip the clutch; and
      in response to a drive mode requiring limited slip of the differential, override the user input.

7. The differential of claim 6, wherein the controller is further programmed to, in response to an expiration of the user input to synchronize speeds of the output shafts, reduce the clutch torque and transition to a limited slip operational mode.

8. The differential of claim 6, wherein the drive mode is a slippery surface operational mode.

9. The differential of claim 6, wherein the user input to synchronize speeds of the output shafts is a user selection of a second drive mode associated with synchronized speeds of the output shafts.

10. A differential controller comprising:
    input channels configured to receive signals indicative of differential output speeds and a condition associated with locking a differential;
    an output channel configured to provide a command to activate a clutch that is configured to adjust relative speeds of differential outputs; and
    control logic configured to generate the command to activate the clutch to lock the differential in response to receiving the signal indicative of the condition, to generate the command to activate the clutch to slip the differential in response to a differential output speed exceeding a threshold during the condition, and to generate the command to activate the clutch such that clutch operates in a limited slip operational mode of the differential in response to both an input indicating a selection of a drive mode associated with a limited slip operational mode of the differential and an input requesting the locking of the differential.

11. The controller of claim 10, wherein the control logic is further configured to generate the command to activate the clutch such that a clutch torque is reduced in response to an expiration of the condition associated with locking the differential and to transition the differential to a limited slip operational mode.

12. The controller of claim 10, wherein the condition associated with locking the differential is a user input requesting the locking of the differential.

13. The controller of claim 10, wherein the drive mode is a slippery surface operational mode.

14. The controller of claim 10, wherein the condition associated with locking the differential is an input indicating the selection of a second drive mode associated with locking the differential.

15. The controller of claim 14, wherein the second drive mode is a beach surface operational mode.

16. The differential of claim 9, wherein the second drive mode is a beach surface operational mode.

* * * * *